June 6, 1967     A. E. SYKES     3,323,424
FLUID OPERATED THRUST UNITS
Filed Nov. 15, 1965     2 Sheets-Sheet 1
FIG.1     FIG.2     FIG.3
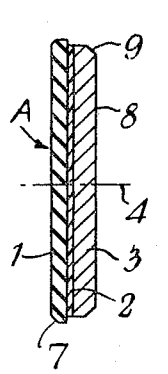
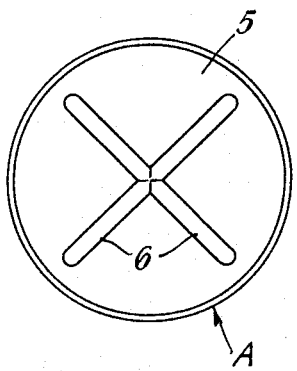
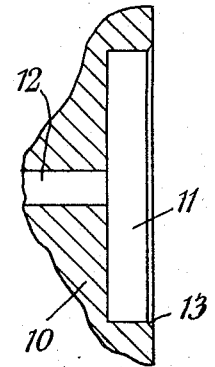
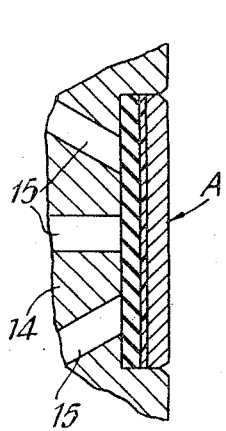
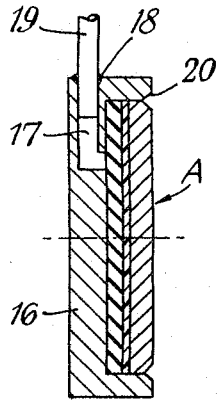
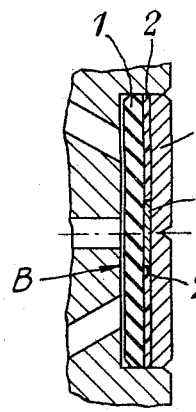
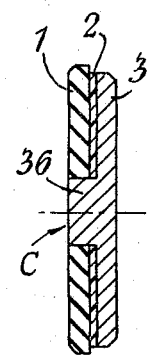
FIG.4     FIG.5     FIG.6     FIG.7

United States Patent Office 3,323,424
Patented June 6, 1967

3,323,424
FLUID OPERATED THRUST UNITS
Alfred E. Sykes, Markfield, England, assignor to Lamalocks Limited, Leicester, England, a British company
Filed Nov. 15, 1965, Ser. No. 507,872
Claims priority, application Great Britain, Nov. 18, 1964, 46,927/64
10 Claims. (Cl. 92—248)

ABSTRACT OF THE DISCLOSURE

A fluid-operated thrust unit consists of three co-axial discs in face-to-face disposition, a first outer disc being formed of a resilient material such as rubber and having a somewhat larger diameter than that of the intermediate disc and second outer disc. The intermediate disc is formed of a synthetic plastics material such as nylon, while the second outer disc is formed of a robust material such as steel. The thrust unit—the exposed face of the first outer disc of which may be grooved—is adapted to be lodged in a recess in a housing, to the back of which recess pressure fluid can be delivered.

---

This invention relates to fluid operated thrust units and has for its main object the provision of a thrust unit and a housing which form an assembly of limited dimensions which possesses all the operating advantages of a conventional hydraulic cylinder and piston assembly.

According to the present invention there is provided a thrust unit comprising a first member of a resilient material, an intermediate second member of a synthetic plastics material of peripheral dimensions slightly less than the peripheral dimensions of the first member, and a third member of a robust material of peripheral dimensions equal to the peripheral dimensions of the second member, the three members being joined with a common axis.

The invention also includes a thrust unit as above specified in combination with a housing having a recess the dimensions of which allows the intermediate second member and the third member to be a close fit therein and the first member to form a seal therewith, the housing having an inlet and at least one duct therein for the admission of fluid pressure to the base of the recess.

In order that the invention may be further understood, several embodiments thereof will now be described, by way of example only, and with reference to the accompanying drawings, in which:

FIG. 1 is a cross-sectional view of a thrust unit constructed in accordance with the invention;

FIG. 2 is a rear view of the thrust unit of FIG. 1;

FIG. 3 is a cross-sectional view of one form of housing which receives a thrust unit in accordance with FIGS. 1 and 2;

FIG. 4 is a cross-sectional view of an assembly of a thrust unit in accordance with FIGS. 1 and 2 and a housing therefor;

FIG. 5 is a cross-sectional view of a further assembly constructed in accordance with the invention;

FIG. 6 is a cross-sectional view of a still further assembly in accordance with the invention showing a modified form of thrust unit;

FIG. 7 is a cross-sectional view of a further form of thrust unit according to the invention;

Figure 8:
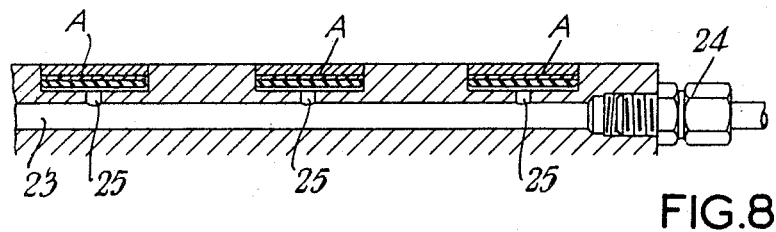
FIG. 8 is a cross-sectional view of a housing showing how a plurality of thrust units may be incorporated therein.

Referring first of all to FIGS. 1 and 2 which show a single thrust unit A in accordance with the invention, it will be seen that the unit comprises a first member in the form of a first disc 1 of a resilient material, for example rubber or neoprene, an intermediate second member in the form of a second disc 2 of a synthetic plastics material, for example nylon, and a third member in the form of a third disc 3 of a robust material, for example steel. The three discs are joined on a common axis 4 and such joint may be made in any convenient manner, for example, by an adhesive although preferably a key will be used, the same to be described later in connection with FIG. 6 and FIG. 7. The exposed face 5 of the first disc 1 is provided with shallow grooves 6 which, in this embodiment, are disposed radially of the disc. The periphery of this face 5 is chamfered at 7 and the periphery of the exposed face 8 of the third disc 3 is chamfered at 9.

A thrust unit as described above is used in combination with a housing, one example of which is illustrated in FIG. 3 at 10. The housing has a recess 11, the diameter of which allows the intermediate second disc 2 and the third disc 3 to have a close but free fit therein and the first disc 1 to form a seal thereover. The first disc 1 will be compressed in forming the seal. The housing 10 has a duct 12 through which fluid pressure may be admitted to the recess 11 behind the thrust unit thereby tending to urge the thrust unit out of the recess. The purpose of shallow grooves 6 in the exposed face of disc 1 will now be apparent in that fluid pressure is spread over the surface of the disc 1 even though the disc 1 is hard against the base of the recess 11. The entry to recess 11 is chamfered at 13 so as to enable easy positioning of the thrust unit.

The embodiment of FIG. 4 shows a modified form of housing 14 in which a plurality of ducts 15 supply fluid pressure to the base of the recess.

In the embodiment of FIG. 5, a first unit, as described in relation to FIGS. 1 and 2, is incorporated in a housing 16 so as to form a casette, the housing 16 being cylindrical and being provided with one or more ducts 17 and an inlet 18 for the connection of a fluid pressure pipe 19 by which fluid pressure may be admitted to the base of the recess. The housing 16 should be of leak proof material, for example, steel, and the casette form of the invention as illustrated in FIG. 5 would be used when the device is to be incorporated in a further housing of a porous metal such as cast iron. If the device within which the thrust unit is to be incorporated is itself of a non-porous material, for example steel, then there is no necessity to use the casette. With the casette, the periphery of the mouth of the recess may be peened as at 20 so as to prevent the thrust unit from falling out of the housing during manipulation.

FIG. 6 shows a modified form of thrust unit B incorporated in the housing of FIG. 4. As will be seen, the thrust unit comprises discs 1, 2 and 3 as before but the method of joining the discs is by providing the intermediate second disc 2 with a central aperture 21 which is filled with a material which forms the join between the first and third discs. This material will be such that it may readily be bonded to the first and third discs. The key is indicated at 22 in FIG. 6.

In FIG. 7 a further thrust unit C has discs 1, 2 and 3 but the disc 3 has a cylindrical extension 36, coaxial with disc 3, which extends through both of the discs 1 and 2.

Figure 9:
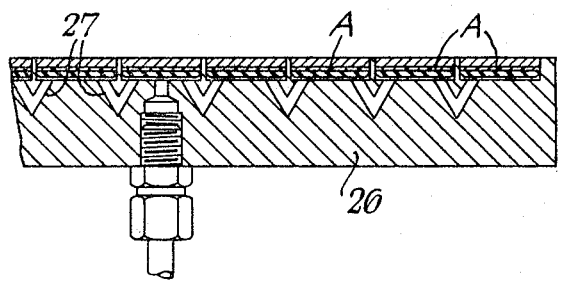
FIG. 9 is a further cross-sectional view of another housing showing a plurality of thrust units incorporated therein in a modified manner.

FIGS. 8, 9, 10 and 11 show various applications of the invention. In FIG. 8 there are a plurality of thrust units A and common ducting 23 leading from an inlet union 24 through which fluid pressure is supplied to the ducting. The common ducting 23 has subsidiary ducts 25 leading therefrom for individual supply of fluid pressure to the thrust units. As will be appreciated, each thrust unit receives the same fluid pressure as all the other thrust units. FIG. 9 is another typical arrangement having a housing 26 with many thrust units A. The recesses which receive the thrust units are all joined by ducts 27 so that again in this embodiment each of the thrust units receives the same fluid pressure as all of the other thrust units.

Figure 10:
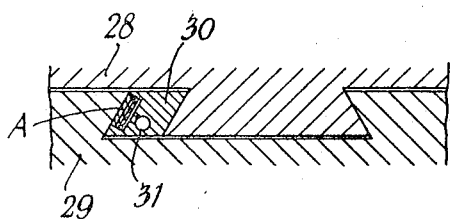
FIG. 10 is a cross-sectional view of yet another housing showing a further use to which a thrust unit in accordance with the invention may be put.
Figure 11:
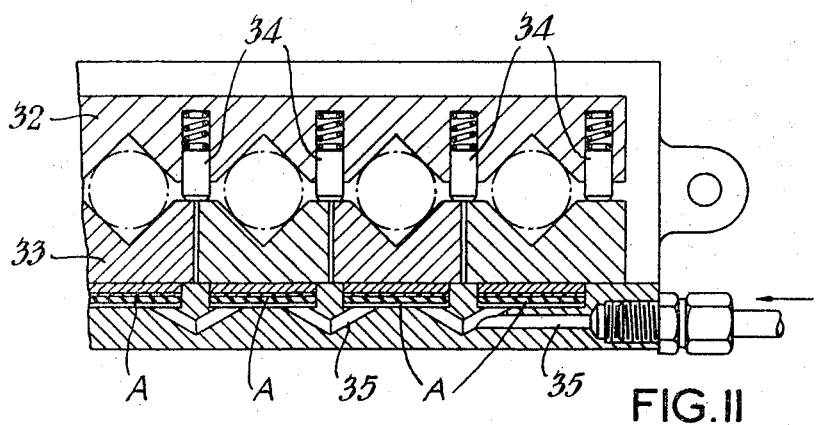
FIG. 11 is a cross-sectional view through work holding means incorporating thrust units in accordance with the invention.

In FIG. 10 is shown how a thrust unit in accordance with the invention may be utilized to prevent movement of a machine slide, the two relatively sliding parts of the machine being illustrated in the FIGURE at 28 and 29. The thrust units are housed in block 30 having fluid supply ducts 31. Finally, as indicated in FIG. 11, the thrust units A may be incorporated in a work holding device in which 32 indicates the fixed jaw and 33 the movable jaw, the two jaws being urged apart by spring loaded plungers 34. Fluid pressure is supplied to the thrust units through ducts 35.

As will be appreciated, each thrust unit is capable of limited movement within the recess in which it is housed. Pressures up to 40,000 lbs. per square inch may be employed in thrusting the pad outwardly, so that great forces are at the disposal of the designer. The thrust unit assembly may be designed into any conventional machine tool or fixture without serious design changes and in such a way that it will not interfere with the size or volume of any conventional part, since all that is required is a shallow cylinder or housing, suitably connected to a fluid pressure supply, such as a pump of automatic or manual operation.

The assembly in accordance with the invention provides a good seal within the housing since the greater the pressure, the better the seal. Also, the intermediate disc acts as an anti-extrusion media for the resilient disc and at high pressure the intermediate disc spreads to form an interference fit with the housing thus completely eliminating the possibility of extrusion.

The assembly may be modified as desired within the scope of the invention as defined in the appended claims, for example, the thrust unit may be spring returned after the fluid pressure is released. Also, although the members which form the thrust units are preferably discs, they may have other shapes, for example, they may be oval.

I claim:
1. A thrust unit, comprising a first member of a resilient material, an intermediate second member of a synthetic plastics material of peripheral dimensions slightly less than the peripheral dimensions of the first member; a third member of a robust material of peripheral dimensions equal to the peripheral dimensions of the second member, and means joining the three members on a common axis.

2. A thrust unit as claimed in claim 1, in which the intermediate second member is provided with a central aperture through which said means extends and joins the first and third members.

3. A thrust unit as claimed in claim 1, in which the first member is of rubber, the intermediate second member is of nylon and the third member is of steel.

4. A thrust unit as claimed in claim 1, in which the exposed face of the first member is provided with shallow grooves and the periphery thereof is chamfered, the periphery of the exposed face of the third member also being chamfered.

5. A thrust unit as claimed in claim 1, in which each of the three members is a disc.

6. The combination of a thrust unit as claimed in claim 1, with a housing having a recess the dimensions of which allow the intermediate second member and the third member to have a close but free fit therein and the first member to form a seal therewith said recess having a base and, the housing having an inlet and at least one duct therein for the admission of fluid pressure to the base of the recess.

7. The combination as claimed in claim 6, in which the housing forms, with the thrust unit, a casette.

8. The combination as claimed in claim 6, in which the housing constitutes part of an existing structure.

9. The combination as claimed in claim 8, in which a plurality of housings are formed in the existing structure each containing a thrust unit, there being common ducting in the structure for the supply of equal fluid pressure to all the thrust units.

10. The combination as claimed in claim 8, in which said existing structure is a work holding device.

No references cited.

EDGAR W. GEOGHEGAN, *Primary Examiner.*